United States Patent
Petry

[15] 3,700,708
[45] Oct. 24, 1972

[54] BIS(DIFLUOROAMINO) ALKYL SUBSTITUTED COMPOUNDS AND METHOD OF PREPARATION

[72] Inventor: Robert C. Petry, Huntsville, Ala.

[73] Assignee: Rohm & Haas Company, Philadelphia, Pa.

[22] Filed: Sept. 4, 1959

[21] Appl. No.: 838,354

Related U.S. Application Data

[63] Continuation-in-part of Ser. No. 790,023, Jan. 29, 1959, abandoned.

[52] U.S. Cl. .......................... 260/453 AL, 149/109, 260/347.7, 260/404.5, 260/482 R, 260/482 C, 260/490, 260/465.5, 260/534 R, 260/563 R, 260/570.5 P, 260/583 NH, 260/584 C
[51] Int. Cl. .................... C07c 87/20, C07c 119/04, C07c 127/16
[58] Field of Search ...................... 260/543, 553, 563, 260/543 F, 583 DD, 453 AL, 553 R, 465.5 R

[56] References Cited

OTHER PUBLICATIONS

Lovelace et al. " Aliphatic Fluorine Compounds" published by Reinhold Publishing Corp. (1958) page 23.

*Primary Examiner*—Charles B. Parker
*Assistant Examiner*—Richard L. Raymond
*Attorney*—George W. F. Simmons and Carl A. Castellan

EXEMPLARY CLAIM

2. Bis(difluoroamino) alkane and alkene compounds containing bis(difluoroamino) substituents in which the difluoroamino groups are attached to carbon atoms, said carbon atoms containing at least one hydrogen substituent, and said carbon atoms being adjacent to one another or in a 1,4 position to one another.

19 Claims, No Drawings

BIS(DIFLUOROAMINO) ALKYL SUBSTITUTED COMPOUNDS AND METHOD OF PREPARATION

This application is a continuation-in-part of application Ser. No. 790,023, filed Jan. 29, 1959, now abandoned.

This invention concerns a process for the production of nitrogen- and fluorine-containing compounds and the products produced thereby.

It has been found that tetrafluorohydrazine, $N_2F_4$, reacts readily with ethylenically unsaturated compounds to form difluoroamino derivatives of said compounds. Thus:

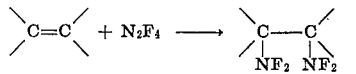

The chemical structure of these tetrafluorohydrazine-olefin adducts is unique with respect to all previously known compounds of similar elementary composition in that fluorine atoms are attached to nitrogen atoms. In this feature lies their usefulness as oxidizing agents, for all compounds containing only fluorine atoms attached to carbon atoms are of no use in this respect. By no other means than the process described above and claimed in this invention is it possible to prepare pure compounds of carbon, hydrogen, nitrogen and fluorine containing the N-difluoroamino-group in a predetermined structural position in the product molecule. Two other general processes accomplish this same general result, i.e., preparation of N-difluoroamino-compounds, viz - (1) by direct combination of elementary fluorine with various organic substrates; (2) by electrolysis of various organic substrates in liquid hydrogen fluoride solution. However, the products thus obtained are invariably perfluorinated and thus contain much elementary composition detracting greatly from any possible usefulness as oxidizing agents and, more significantly, products obtained from these processes are such complex mixtures containing minor quantities of N-difluoroamino-compounds that the processes are recognized by all investigators familiar with them as being useless for the synthesis of any given N-difluoroamino-compound in workable or practical quantity and purity.

The presence of the N-difluoroamino structural unit in any given compound is recognizable and proven by its chemical behavior, i.e., it behaves as an oxidizing agent, in some respects similar to other known N-halogenated amino compounds. Thus the reaction of any and all known N-difluoroamino compounds with solutions of iodide salts in appropriate solvents invariably results in the liberation of quantities of elementary iodine and of fluoride ion which are related stoichiometrically to the elementary composition of the N-difluoroamino-compounds. This behavior is true of nitrogen trifluoride and of all N-monofluoroamino compounds as well. Examples of compounds which have been tested in this manner and for which this behavior has been used in correlation with other measurements of physical properties and elementary analyses in establishing rigorously the complete structural identities thereof are: nitrogen trifluoride ($NF_3$), difluorodiazine ($N_2F_2$), tetrafluorohydrazine ($N_2F_4$), perfluoromethylamine ($CF_3NF_2$), perfluoroethylamine ($C_2F_5NF_2$), perfluoropiperidine ($C_5F_{10}NF$), perfluoroisopropyl amine (($CF_3$)$_2CFNF_2$), perfluoroacetone-imine (($CF_3$)$_2C$=NF) pentafluorosulfur-perfluoromethylamine ($SF_5CF_2NF_2$), in addition to all of those N-difluoroamino compounds mentioned elsewhere in this application and claimed as products of this invention.

The ethylenically unsaturated compounds useful as reactants in the present invention can be represented by the general formula:

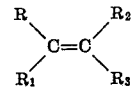

in which R, $R_1$, $R_2$, and $R_3$, taken individually, can be hydrogen, alkyl, alkaryl, alkenyl, alkinyl, aryl, halogen, carbalkoxy, carboxyl, and isocyanato, and any two of R, $R_1$, $R_2$, and $R_3$, on adjacent carbon atoms taken together with the two carbon atoms to which they are attached, can form a ring system selected from the group consisting of cyclopentadiene, tetrahydrobenzene, and carbonate.

Typical examples of ethylenically unsaturated compounds which react with tetrafluorohydrazine include the following:

ethylene
propylene
butene-1
butene-2
styrene
vinyltoluene
1,1,2-trichloroethylene
1,1,2-trifluoroethylene
butadiene, 1,3
isoprene
1,1-difluoroethylene
vinyl n-butyl ether
divinyl ether
allyl vinyl ether
tetravinyl pentaerythritol
furan
1-methoxybutadiene-1,3
acrylic acid
3-butenoic acid
vinylene carbonate
isobutylene
hexene-2
propadiene-1,2
cyclopentadiene-2,4
1,2-diphenyl ethylene
1-methyl-1-phenylethylene
cyclohexene
1,1,2-trifluorobutadiene-1,3
monobromoethylene
1-chloropropene-2
1-bromopropene-2
1-fluoro,2,3-dichloropropene-2
ethyl vinyl ether
vinyl isocyanate
vinyl stearate
vinyl acetate
1-methyl-1-vinylacetylene
2-chloropropene
β-chloroacrylonitrile
methyl acrylate Acrylonitrile and alkyl and aryl acrylates and methacrylates are also suitable reactants. Typical acrylates and methacrylates are the methyl, ethyl, propyl, butyl, cyclohexyl, 2-ethylhexyl, lauryl, cetyl and stearyl esters of acrylic and methacrylic acids. The bromo compounds corresponding to the hereinbefore listed chloro and fluoro compounds can also be employed to give the corresponding bromo derivatives.

Tetrafluorohydrazine is prepared by heating nitrogen trifluoride ($NF_3$) at substantially atmospheric pressure and at a reaction temperature of from about 100°C. to about 500°C., preferably 375° to 450°C., in the presence of a catalytic metal surface, such as copper, arsenic, or stainless steel, to form tetrafluorohydrazine ($N_2F_4$). When employing a reaction temperature in the range of 375° to 450°C., the contact time of the nitrogen trifluoride with the catalytic metal surface should be about 10 to about 15 minutes. The reaction mixture is condensed at low temperatures and the tetrafluorohydrazine is separated therefrom.

Since one mole of tetrafluorohydrazine reacts with one double bond in the ethylenically unsaturated compound to form the 1 to 1 adduct or the bis(difluoroamino) group at each double bond, there should be at least one mole of tetrafluorohydrazine per mole of double bond in the ethylenically unsaturated compound. In some cases, depending on the activity of the ethylenically unsaturated compound and the reaction conditions employed, an excess of tetrafluorohydrazine will increase the yield of the desired compound and/or shorten the reaction time required to obtain high conversion of the ethylenically unsaturated compound to the corresponding difluoroamino derivative. Thus, a ratio of as high as 5.0 moles of tetrafluorohydrazine per mole of double bond in the ethylenically unsaturated compound has given high yields at appreciably shortened reaction times. Much higher molar ratios of tetrafluorohydrazine to double bonds in the ethylenically unsaturated compound can be employed without changing the nature of the reaction. Large excesses of tetrafluorohydrazine will result in higher yields, particularly if the double bond in the ethylenically unsaturated compound has a low order of reactivity. The amount of excess tetrafluorohydrazine employed above a value of about 2.0 moles of tetrafluorohydrazine per mole of double bond in the ethylenically unsaturated compound will be dictated by the economics of the particular compounds being employed and the value of the reaction products. The optimum range of ratios of moles per double bond in said ethylenically unsaturated compound to moles tetrafluorohydrazine is from 1 to 1 to 1 to 2.5.

The reaction temperature employed also depends somewhat on the specific ethylenically unsaturated compound used, but the operable range is from 40°C. to about 150°C. A preferred range is from 60° to 120°C.

The reaction can be carried out at sub-atmospheric pressure, or superatmospheric pressures. Superatmospheric pressures generally result in improved yield and generally shorter reaction times and an operable range of pressures is from about 1 atm. to about 10 atm. Higher pressures can be employed without changing the nature of the reaction, and, particularly with compounds in which the double bond exerts low reactivity, will improve the yield of the desired product. The upper limit of the pressure employed is dictated by the economics of the particular compounds being employed in the reaction and the value of the reaction products obtained therefrom. A preferred range of operating pressure is from 100 mm. to 5 atms.

The course of the reaction does not appear to be affected by the nature of the surface of the reaction vessel. Thus, results obtained in Pyrex glassware correlated closely with the results obtained in a stainless steel bomb.

The reaction time will depend in part at least on the temperature and pressures employed and on the reactivity of the ethylenically unsaturated compound used. The ratio of moles tetrafluorohydrazine per mole of double bond of the ethylenically unsaturated compound, as stated hereinbefore, will also affect the reaction time. Specifically, employing ethylene or propylene as the ethylenically unsaturated compound, at reaction temperatures of 110° to 120°C., at atmospheric pressure and a 1 to 1 molar ratio of tetrafluorohydrazine to the unsaturated hydrocarbon, a reaction time of 15 hours produced a yield of the bis(difluoroamino) derivatives of approximately 50 percent. When employing styrene as the ethylenically unsaturated aliphatic compound and operating under the same reaction conditions, a reaction time of five hours produced a 50 percent yield to the 1 to 1 adduct. However, using propylene as the ethylenically unsaturated compound, a reaction temperature of 110° C., a pressure of 5 atmospheres, and a molar ratio of tetrafluorohydrazine to propylene of 1.5 to 1.0, a reaction time of 2 hours produced a yield of the 1 to 1 adduct of 90 percent based on propylene charged. Thus, depending on the conditions, a reaction time of 2 to 15 hours is required.

The addition of tetrafluorohydrazine to high boiling liquid or solid olefins is best carried out in solution. A relatively high boiling solvent such as n-decane or chlorobenzene is generally used with an $N_2F_4$ pressure of 5 atms. or less over the solution. In general catalytic amounts of azodiisobutyronitrile or benzoyl peroxide were used in the solution reactions. Operating temperature varies from 50° to 100° C. depending on the reactivity of the olefin.

The compounds of the present invention are valuable as high energy oxidizing agents in propellants for use in such projectiles as rockets and missiles as hereinafter set forth. Because their boiling points are much higher than that of liquid oxygen, a commonly used oxidizer for liquid fuels, they can be safely stored in missiles so that the missiles are ready for firing at all times. Liquid oxygen, on the other hand, cannot be safely stored in "charged" missiles, and a delay of many hours before the missile can be fired is caused by the necessity of charging liquid oxygen to the projectile.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are degrees centigrade unless otherwise noted:

EXAMPLE I

Preparation of 1,2-Bis(difluoroamino)ethane($C_2H_4N_2F_4$)

A 500 cc. evacuated Pyrex bulb equipped with stopcock and condensing arm was charged in vacuo with $8.7 \times 10^{-3}$ mole crude $N_2F_4$ (75% $N_2F_4$; impurities were $NF_3$, $N_2O$ and NO) and $6.7 \times 10^{-3}$ mole ethylene. The bulb was attached to a capillary manometer, placed in an oil bath and maintained at 110° to 120° C. for 15 hours. The pressure decreased from an initial value of 655 mm. (110° C.) to a value of 435 mm. (110° C.) during the time interval. The bulb was removed from the oil bath and the condensing arm immersed in a bath at −196° C. A pressure of approximately 3 mm. of noncondensable gas was pumped from the bulb. The material in the reaction bulb was warmed to room temperature and transferred into the vacuum system. Some non-volatile, transparent, viscous material remained in the reaction bulb. The material which had transferred into the vacuum system was fractionated through traps maintained at −78°, −110°, −160° and −196° C. The combined −160° and −196° C. fractions amounted to $4.8 \times 10^{-3}$ mole. The percentage composition of this fraction was determined by mass spectral analysis. 88 percent of the $N_2F_4$ had reacted; the ratio of $N_2F_4$ to ethylene consumed in the reaction was 1.16. The NO originally present as impurity in the $N_2F_4$ had reacted while the amounts of $NF_3$ and $N_2O$ present before and after reaction were essentially unchanged.

The −78° and −110° C. fractions were combined and refractionated through traps at −46°, −66°, −96° and −196° C. for about 3 hours. The major fraction was found in the −96° trap. The very small amounts of material in the other traps were discarded. The fraction collected at −96° C. was a colorless liquid with a vapor pressure of 32 mm. at 0° C. The same vapor pressure was rapidly obtained by warming the sample from −96° C. or cooling the sample from room temperature, indicating the fraction was quite homogeneous. A molecular weight determination on an aliquot of the fraction by the gas density method gave a value of 130.3; $C_2H_4N_2F_4$ requires 132.1. The yield based on the $N_2F_4$ consumed in the reaction was 55 percent.

Anal. Calculated for $C_2H_4N_2F_4$: C, 18.19; H, 3.05; N, 21.21; F, 57.55. Found: C, 18.60; H, 3.29; N, 20.55; F, 53.9.

EXAMPLE II

Preparation of 1,2-Bis(difluoroamino)propane($C_3H_6N_2F_4$)

The apparatus used was the same as described above for the preparation of the ethylene adduct. The reaction bulb was charged with $6.4 \times 10^{-3}$ mole crude $N_2F_4$ (86% $N_2F_4$; impurities were $NF_3$, $N_2F_2$, NO and $N_2O$) and $6.1 \times 10^{-3}$ mole propylene. The reaction bulb was heated at 100° to 110° C. for 8 hours. The pressure decreased from an initial value of 518 mm. (106° C.) to 316 mm. (106° C.) during the heating period. The reaction mixture was fractionated essentially as described above for the ethylene —$N_2F_4$ reaction mixture. A considerable amount of viscous, transparent, non-volatile residue remained in the reaction bulb. The major product fraction collected at −96° C. was a colorless liquid with a reproducible vapor pressure of 21 mm. at 0° C. A molecular weight determination on an aliquot of the fraction by the gas density method gave a value of 146.9; $C_3H_4N_2F_4$ requires 146.1. The fraction weighed 0.45 gram (approx. 60 percent yield based on the $N_2F_4$ consumed in the reaction).

Calculated for $C_3H_4N_2F_4$: C, 24.66; H, 4.14; N 19.18; F, 52.02. Found: C, 24.72; H, 4.74; N, 18.05; F, 49.9.

EXAMPLE III

Preparation of 1,1,2-trichloro-1,2-bis(difluoroamino)ethane ($C_2HN_2Cl_3F_4$)

The apparatus used for this reaction was a calibrated 2.224 liter gas storage bulb with manometer, attached to a vacuum manifold via a stopcock.

A sample of $N_2F_4$ was expanded in the bulb giving a pressure of 361.5 mm. at 29.5° C. The $N_2F_4$ contained 75% $N_2F_4$, 10% $NF_3$, 9.4% $N_2O$ and 5.4% NO. Initial quantity of gas was 0.042 mole; of $N_2F_4$, 0.0315 mole.

A sample of commercial trichloroethylene was partly condensed in a Dry Ice trap under vacuum and a 3.3 gram (0.025 mole) portion of this was condensed into the reaction bulb after removing the $N_2F_4$. The olefin alone showed a vapor pressure of 73.0 mm. at 27.5° C.

The $N_2F_4$ was condensed into the bulb with the olefin. While warming to room temperature, it was noticed that the $N_2F_4$ appeared to be quite soluble in the liquid olefin. After 1.5 hours at room temperature, the total pressure was only 370 mm. at 27.8° C.

The bulb was immersed in hot water giving a pressure of 457 mm. at 72°. After 24 hours at 72° to 75°, the pressure rose to 635 mm., showing that little or no reaction had taken place. The temperature was raised to 88°; before this temperature was reached, a pressure maximum was registered; 654 mm. at 85°. Thereafter the pressure dropped at a rate of 3 to 5 mm. per hour. 24 hours after the maximum pressure was reached, the pressure was 551 mm. at 87°. During the next 16 hours, the pressure dropped to 522 mm. at 88° where it remained essentially constant. About 0.5 cc. of liquid collected in the manometer. When the apparatus cooled to room temperature the vapor pressure of the mixture was 301.0 mm. at 25.5°. No noncondensable gas was formed during the reaction.

The mixture was distilled rapidly through traps at −51°, −78°, and −196°. The liquid portion of the mixture was retained at −51°; nothing was present in the −78° trap. The volatile portion collected in the −196° trap was returned to the reaction bulb, giving a pressure of 239.8 mm. at 25.3°. This fraction contained 66.6% $N_2F_4$, 20.4% $NF_3$, 11.8% $N_2O$ and 2.6% NO. Recovered $N_2F_4$ was thus 0.0189 mole; 0.0126 mole was used in reaction. On this basis, a quantitative conversion to 1:1 adduct (M. W. 235.5) would give 2.96 grams of product.

The liquid portion of the reaction product was distilled repeatedly into a trap at −51°. After the sixth distillation, the vapor pressure of the passed fraction had decreased from 66.5 mm. to 49.0 mm. at 20°. A seventh distillation through a trap at −25° gave fractions; passed, 24.2 mm.; retained, 10.3 mm. at 20°. The retained fraction weighed 1.79 grams and was transferred to a conventional fractional distillation apparatus avoiding exposure to atmospheric moisture. It was distilled under reduced pressure in a dry atmosphere giving three equal fractions: 1. 46°–47°

/38.5–38.2 mm.; 2. 46°/36.7–35.7 mm.; 3. apparatus hold-up which came over at about 40°/26 mm. Almost no residue. Nuclear magnetic proton and fluorine resonance spectra of the three fractions showed fractions 1 and 2 to be almost identical; a trace impurity appeared in fraction 3. Fraction 2 was submitted for elementary analysis.

Analysis Calculated for $C_2HN_2Cl_3F_4$: C, 10.20; H, 0.43; N, 11.90; Cl, 45.19; F, 32.28. Found: C, 10.45; H, 0.61; N, 12.25; Cl, 45.53; F, 29.2.

EXAMPLE IV

Preparation of 1,2-bis(difluoroamino)propane ($C_3H_6N_2F_4$)

A 1.5:1 molar ratio of $N_2F_4$ to propylene was heated at 110° C. in a 500 cc. stainless steel bomb for 2½ hours. The pressure decreased from an initial value of 72 psi (25° C.) to a value of 21 psi (25° C.). The product fraction was distilled through a Holtzman column under an atmosphere of nitrogen yielding approximately 6g. of 1,2-bis(difluoroamino)propane b. p., 83° to 84° C. at 760 mm. (approximately 90 percent yield based on propylene used for the experiment). The bomb reaction was considerably more rapid than that previously observed in Pyrex reaction vessels at lower pressures.

EXAMPLE V

Preparation of 1,2-bis(difluoroamino)-1-phenylethane

A 2.5:1 molar ratio of $N_2F_4$ to styrene was heated in a 500 cc. Pyrex reaction vessel at 104° C. for 2 hours. The major product fraction was a liquid of negligible vapor pressure at room temperature. It was distilled with a molecular still and collected as one fraction which was identified as 1,2-bis(difluoroamino)-1-phenylethane on the basis of its infrared spectrum, NMR spectrum, and elemental analysis. There was apparently little polystyrene formed in the reaction.

EXAMPLE VI

Preparation of 1,4-Bis(difluoroamino)Butene-2 and 1,2Bis(difluoroamino) Butene-3

A 3:1 molar ratio of $N_2F_4$ to 1,3 butadiene was heated in a 2.21. Pyrex reaction vessel at 60° to 70° C. for 2 hours. The pressure decrease corresponded to the formation of a 1:1 adduct. Further heating at 100° to 110° C. produced no additional pressure drop. Work up of the reaction mixture yielded 6.3 g. of crude product. (The calculated yield based on the butadiene used for the experiment together with the assumption that only 1:1 adducts were present in the crude product fraction, was 110 percent). The crude product was separated into four fractions by distillation through a Holtzman column at reduced pressure. Fraction 1, b.p., 47° to 48° at 108 mm is 1,2-bis(difluoroamino)butene-3. The infrared and NMR spectra support the proposed structure. Fraction 3, b.p., 85° C. at 108 mm is 1,4-bis(difluoroamino)butene-2. Infrared and NMR spectra and elemental analysis are consistent with the proposed structure. The infrared spectra of fraction 2, b.p., 48° to 85° C. at 108 mm, showed a mixture of the 1,2 and 1,4 isomers. The infrared spectrum of fraction 4 (column hold up and pot residue) showed that this fraction contained the 1,4 isomer with a small amount of unknown contaminant. The respective yields of the 1,4 and 1,2 isomers were not determined but the former predominated the reaction mixture.

EXAMPLE VII

Preparation of 1,2-Bis(difluoroamino)-hexafluoropropane

A 2:1 molar ratio of $N_2F_4$ to perfluoropropylene was heated in a 500 cc. stainless steel bomb at 140° to 150° C. for 4 hours ($P_i$ = 80 psi at 25° C.). Work up of the reaction mixture yielded 9.2 g. of 1,2-bis(difluoroamino)hexafluoropropane b.p., 35° C. at 760 mm. (95 percent yield based on perfluoropropylene used for the experiment). Molecular weight, mass and NMR spectra support the proposed structure. Elemental analysis agreed for carbon and nitrogen.

EXAMPLE VIII

The preparation of α, β-bis(difluoroamino)ethyl isocyanate and its conversion to solid NF derivatives is represented by the following equations:

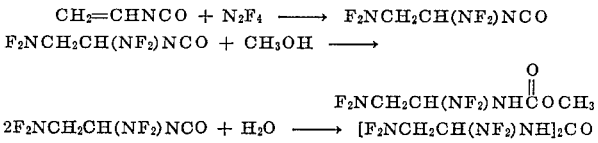

Preparation of α,β-Bis-(difluoroamino)Ethyl Isocyanate

The following reaction is typical of those olefin additions carried out in stainless steel bombs.

A 1l. stainless steel bomb equipped with a pressure gauge, valve and a ball joint for attachment to the vacuum line, was charged in vacuo with 6.2 × 10⁻² mole degassed vinyl isocyanate and 14 × 10⁻² mole $N_2F_4$ (98% $_2F_4$; impurities $N_2O$ and NO). The bomb was placed in an oil bath and heated at 110° to 115° C. for 2 hours. The pressure fell from a maximum of 71 psi (108° C.) to 35 psi (112° C.) during the heating period. The bomb was cooled to −80° C. and the excess $N_2F_4$ removed by pumping thru traps maintained at −80° and −196° C. The bomb was then brought to room temperature and pumping continued for one hour. The excess $N_2F_4$ fraction collected at −196° C., amounted to 8.0×10⁻² mole. Mass spectral analysis showed 97% $N_2F_4$; trace $CH_2$=CHNCO and $N_2O$. The product fraction collected at −80° C. was a clear colorless liquid at room temperature. It weighed 9.5 g. (89 percent yield). Distillation through a Holtzman column in a nitrogen atmosphere yielded essentially one cut b.p. 50°/108 mm. The product from these reactions was converted to solid derivatives.

Preparation of α,β-Bis-(difluoroamino)Ethyl Carbamate 30 ml. of degassed absolute methanol was transferred in vacuo to a bulb containing 2.9 g. of α,β-bis-(difluoroamino)ethyl isocyanate. The mixture was stirred at room temperature with a magnetic stirrer for 1 hour. All volatiles were then removed by pumping for 2 hours at room temperature. The white crystalline carbamate which remained in the reaction bulb was recrystallized from petroleum ether. The yield of white crystalline carbamate, M.P. 64° C. was 3.4 g. (essentially quantitative).

Analysis Calc'd.: C, 23.41; H, 3.41; N, 20.49; F, 37.07. Found: C, 23.88; H, 3.59; N, 20.57; F, 37.3.

Hydrolysis of α,β-Bis-(difluoroamino)Ethyl Isocyanate

A 250 cc. reaction flask was charged with 100 cc. benzene, 10.4 g. (0.060 mole) of $F_2NCH_2CH(NF_2)NCO$, 2 g. (0.11 mole) water and 4 drops of pyridine. The solution was vigorously stirred at ambient temperature (under these conditions the reaction showed little exotherm). Precipitation of N,N'(1,2-bis-(difluoroamino)ethyl) urea, $(F_2NCH_2CH(NF_2)NH)_2CO$, started within thirty minutes. After 1 hour the solution was filtered yielding 4.6 g. of the white crystalline urea derivative, M.P. 173° C. The filtrate was stirred for 6 more hours yielding an additional 2.8 g. of urea derivative. Yield 7.4 g.; 77 percent.

Analysis Calc'd.: C, 18.75; H, 2.50; N, 26.25; F, 47.50. Found: C, 18.59; H, 2.64; N, 24.90; F, 47.3.

EXAMPLE IX

Reaction of Isopropenyl Acetylene with $N_2F_4$

A 1l. stainless steel bomb equipped with a pressure gauge, valve and a ball joint for attachment to the vacuum line was charged in vacuo with $6.4 \times 10^{-2}$ mole isopropenyl acetylene and $13.0 \times 10^{-2}$ mole $N_2F_4$ (purity 70 percent; impurities $C_2F_6$, $NF_3$, $N_2O$). The bomb was placed in an oil bath and heated at 70° to 73° C. for 2 hours. The pressure decreased from a maximum of 59 psi (50° C.) to a minimum of 41 psi (73° C.) during the heating period. The bomb was then cooled to −80° C. and the excess $N_2F_4$ fraction removed by pumping through traps at −80° and −196° C. The bomb was then brought to room temperature and pumping continued for 1 hour. The excess $N_2F_4$ fraction collected at −196° C. amounted to $8.1 \times 10^{-2}$ mole (analysis: 58% $N_2F_4$, remainder $C_2F_6$, $NF_3$ and $N_2O$). The $N_2F_4$ consumed in the reaction amounted to $4.5 \times 10^{-2}$ mole or 0.7 mole per mole isopropenyl acetylene. The product fraction collected at −80° C. was yellow in color. On warming to room temperature the liquid slowly evolved $SiF_4$ over a period of 1 hour in the Pyrex trap. (The $SiF_4$ formed did not amount to more than a few percent of the product fraction). When gas evolution ceased, air was admitted to the trap and the product fraction was distilled at reduced pressure through a Vigreux column. Two fractions were obtained, I, b.p. 32° to 33° C/30 mm.; II, b.p. 45° C./3 mm.

Fraction I was identified as $F_2NCH_2C(CH_3)(NF_2)C\equiv CH$. Its infrared spectrum shows C≡CH absorption at 3.05μ, C≡C at 4.70μ with multiple absorption in the 9.5 to 12.25μ region, the strongest bands occurring at 11.3 and 12.2μ. The NMR spectrum was in complete accord with the above structure. $F^{19}$ resonance occurs at −5,628 cycles, triplet $\underline{F_2}NCH_2$—$_{and}$ −4,506 cycles, singlet $\underline{F_2}NC(CH_3)$—to the low field side of trifluoroacetic acid. The proton spectrum consisted of a singlet at 205.4 cycles —$\underline{CH_3}$, a singlet at 165.8 cycles ≡ $\underline{CH}$ and a wide spaced triplet occurring at 89.3, 115.8, and 142.6 cycles, $\underline{CH_2}$ to the high field side of benzene.

Analysis Calc'd. for $C_4H_6N_2F_4$: F = 44.7 Found: F = 42.4.

EXAMPLE X

Reaction of Perfluorovinyl Iodide with $N_2F_4$

A 1l. stainless steel bomb equipped with a pressure gauge, valve and a ball joint for attachment to the vacuum line was charged in vacuo with $7.3 \times 10^{-2}$ mole of $CF_2=CFI$ and $11.0 \times 10^{-2}$ mole $N_2F_4$ (purity ~75 percent; impurities $C_2F_6$, $N_2O$, $NF_3$). The bomb was placed in an oil bath and heated at 100° to 106° C. for 2 hours. The pressure decreased from a maximum of 47 psi (106° C.) during the heating period. The bomb was then cooled to −80° and the excess $N_2F_4$ fraction removed by pumping through traps at −80°, −120° and −196° C. The bomb was then brought to room temperature and pumping continued for 2 hours. The excess $N_2F_4$ fraction collected at −196° C., amounted to $3.8 \times 10^{-2}$ mole (analysis 50% $N_2F_4$, remainder $C_2F_6$, $N_2O$, $NF_3$). The $N_2F_4$ consumed in the reaction amounted to $6.4 \times 10^{-2}$ mole; 0.87 mole $N_2F_4$ per mole $CF_2=CFI$. The −120° trap contained a considerable amount of what proved to be the imine $F_2NCF_2CF=NF$. The main product fraction collected at −80° C. contained a large amount of iodine. After warming to room temperature, an atmosphere of nitrogen was admitted to the trap and the liquid adduct was decanted from the solid iodine into an equal volume of n-decane. The n-decane solution was shaken with mercury to remove residual iodine and the solution distilled through a Vigreux column in a nitrogen atmosphere. Mercury was added to the still pot and the solution was stirred during distillation. The adduct distilled as a colorless liquid b.p. 82° C./760 mm. which slowly liberated iodine on standing at room temperature under nitrogen. Light and oxygen were found to catalyze the decomposition. The product is stable at −78° C. in the absence of air. Principal infrared bands occur at 8.0, 8.55, 8.75, 10.5, 10.75, 11.3, 11.85, 12.9, and 13.9 microns. The $F^{19}$ NMR spectrum consisted of unresolved NF bands at −5032 cycles; $\underline{F_2}NCF_2$—, −3,949 cycles; $\underline{F_2}NCFI$— and a quartet of bands corresponding to fluorine on carbon at +904, 1,114, 1,247, and 1,464 cycles (trifluoroacetic acid as standard). A molecular weight determination gave a value of 294 (theoretical 314).

EXAMPLE XI

Reaction of Divinyl Ether with $N_2F_4$

A mixture of 7.0 g. (0.1 mole) divinyl ether and 9.98 g. (0.096 mole) tetrafluorohydrazine were charged into a 1 liter stainless steel bomb under vacuum (liquid nitrogen temperature). The bomb was warmed to ambient temperature than placed in an oil bath and heated to 66° C. for a period of 4 hours during which time pressure dropped from a maximum of 48 to 16.5 psi. After cooling to ambient temperature the reaction mixture was fractionated on vacuum line. The excess tetrafluorohydrazine was condensed into a liquid nitrogen trap and later expanded into a 2 liter expansion bulb. A total of 0.027 mole was recovered. The products from the reaction were collected in a Dry Ice-acetone trap and redistilled to give:

(A) Monoadduct b.p. 46–47° C. (75 mm.) 43.5%
(B) Diadduct b.p. 38–40° C. (13 mm.) 16%

| | | |
|---|---|---|
| Calculated for $C_4H_6F_4N_2O$: | % F: 43.6 | |
| Found: | % F: 43.4 | mono adduct |
| Calculated for $C_4H_6F_8N_4O$: | % F: 54.6 | |
| Found: | % F: 53.8 | diadduct |

EXAMPLE XII

Reaction of Trans-Stilbene and Tetrafluorohydrazine in Chlorobenzene

The reaction system was a 500 ml. steel flask equipped with a copper nitrogen inlet extended to near the bottom of the flask, a copper inlet connected to a pressurized cylinder of tetrafluorohydrazine and a third opening connected to a 400 ml. copper bulb, a mercury manometer and an outlet tube. A mixture of 10.0 g. of trans-stilbene and 70 ml. of chlorobenzene was placed in the flask; 0.20 g. of azo-bis-isobutryonitrile was added as an initiator. The system was flushed with nitrogen, evacuated to 200 mm. pressure and then pressurized to 1,000 mm. with tetrafluorohydrazine. The solution was warmed slowly and stirred magnetically for 4 hours at 75°; tetrafluorohydrazine uptake was complete in 3 hours. The system was cooled to room temperature and flushed well with nitrogen. The chlorobenzene solution and an insoluble solid were washed from the reaction flask with methylene chloride. Methylene chloride was removed at reduced pressure and the residual chlorobenzene solution was chilled in ice water. Filtration gave 4.78 g. of solid, m.p. 156° to 157° C. The filtrate was reduced to dryness in vacuo and the residue recrystallized from ligroin three times to give an additional 1.04 g. of meso- $\alpha, \alpha'$-bis-difluoroaminodibenzyl m.p. 157° to 158° C.

Analysis Calc'd. for $C_{14}H_{12}N_2F_4$: C, 59.15; H, 4.26; N, 9.86; F, 26.74. Found: C, 59.60 N, 9.88

The combined ligroin filtrates were reduced in volume and chilled; 5.94 g. of material, m.p. 107° to 110° C. was obtained. When this material was again dissolved in ligroin, 0.06 g. of material, m.p. 156° to 157° remained. Two additional crops of dl, $\alpha, \alpha'$-bis-difluoroaminodibenzyl were obtained from the filtrate of the 5.94 g. crop; the first weighed 2.42 g. m.p. 111.5° to 113° C. and the second weighed 0.57 g. m.p. 110° to 112°.

Analysis Calc'd. for $C_{14}H_{12}N_2F_4$: C, 59.15; H, 4.26; N, 9.86; F, 26.74. Found: C, 59.03; H, 4.63; N, 10.22; F, 24.8.

Additional examples including those hereinbefore presented are summarized in Table I.

TABLE I

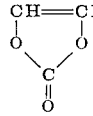

| | Reaction conditions [a] | |
|---|---|---|
| | Molar ratio $N_2F_4$: olefin | Temperature, °C. |
| $CH_2=CH_2$ | 1:1 | 110 |
| $CH_3CH=CH_2$ | 1:1 | 110 |
| | 1.5:1 (bomb) | 110 |
| $(CH_3)_2C=CH_2$ | 1.3:1 | 110 |
| $CH_3CH=CH-CH_2C_2H_5$ | 2.5:1 | 120 |
| $CH_2=CHCH-CH$ | 3:1 | 70 |
| $CH_2=C=CH_2$ | 2:1 | 110 |
| $CF_2=CFCH=CH_2$ | 3:1 (bomb) | 30 |
| $CCl_2=CHCl$ | 1.3:1 | 90 |
| $CF_2=CH_2$ | 0.9:1 | 130 |
| $CF_3CF=CF_2$ | 2:1 (bomb) | 150 |
| $CH_2FCCl=CCLH$ | 2:1 (bomb) | 150 |
| $CH_2=CHCH_2Cl$ | 1.5:1 | 110 |
| $CH_2=CHCH_2Br$ | 2:1 (bomb) | 120 |
| $\phi CH=CH_2$ | 1.5:1 | 100 |
| $CH_2=CHOCH_2CH_2C_2H_5$ | 4:1 | 120 |
| (cyclic CH=CH with two O and C=O) | 4:1 | 125 |
| $CH_2=CHNCO$ | 2:1 (bomb) | 100 |
| $CH_3CH=CHCH_3$ | 1.2:1 (bomb) | 100 |
| $CH_2=C(CH_3)C=CH$ | 1.4:1 (bomb) | 70 |
| $ClCH_2=CHC-N$ | 1.7:1 (bomb) | 150 |
| $(CH_2=CH)_2O$ | 1.4:1 (bomb) | 75 |
| $CH_2=CHCH_2OCH=CH_2$ | 1.4:1 (bomb) | 80 |
| $(CH_2=CHOCH_2)_4C$ | Solution reaction | 80 |
| (cyclic vinyl ether) | 2:1 (bomb) | 100 |
| $CH_3OCH=CH-CH=CH_2$ | 1:0.75 (bomb) | 50 |
| $CH_2=CHCH_2O\overset{O}{\overset{\|}{C}}H$ | 1.2:1 (bomb) | 100 |
| $CH_2=CHO\overset{O}{\overset{\|}{C}}H$ | 1:1 (bomb) | 100 |
| $CH_3CCl=CH_2$ | 1.2:1 | 110 |
| (cyclopentene) | 2:1 (bomb) | 25 |
| $\phi C(CH_3)=CH_2$ | Solution reaction | 60 |
| $\phi CH-CH\phi$ | do | 75 |
| (cyclohexene) | do | 80 |
| $CH_2=CHBr$ | 1.5:1 (bomb) | 100 |
| $CH_2=CHOC_2H_5$ | 1.2:1 (bomb) | 100 |
| $CF_2=CFH$ | 1:1 (bomb) | 110 |

[a] Reaction vessels were Pyrex unless otherwise noted; the bombs were stainless steel. Bomb reactions were made with an initial pressure of 100 psi or less at reaction temperature; reactions in Pyrex were made with the initial pressure in the range from 300–600 mm, at reaction temperature. Solution reactions were run in chlorobenzene of n-decane solvents with an $N_2F_4$ pressure of 1000–700 mm, over the solution. In general catalytic amounts of azo-di-isobutyronitrile or benzoyl peroxide were used in the solution reactions.

The compounds of the present invention are of interest as storable monopropellants, i.e., they combine in one molecule the "fuel" and the oxidizing agent. Thus, 1,2-bis(difluoroamino)propane can be burned in the absence of oxygen. 1,2-bis(difluoroamino)ethane offers even greater possibilities as a monopropellant since it is balanced with respect to carbon, hydrogen, fluorine and nitrogen. It has a calculated specific impulse in the 275 to 300 sec(1,000 psi) range, and burns in the absence of oxygen to carbon, nitrogen, and hydrogen fluoride.

I claim:

1. A bis(difluoroamino) alkyl substituted compound wherein the compound is selected from the group consisting of an amine, an isocyanate, a urea, and a nitrile.

2. Bis(difluoroamino) alkane and alkene compounds containing bis(difluoroamino) substituents in which the difluoroamino groups are attached to carbon atoms, said carbon atoms containing at least one hydrogen substituent, and said carbon atoms being adjacent to one another or in a 1,4 position to one another.

3. A bis(difluoramino)alkene.

4. A bis(difluoramino)alkyl nitrile.

5. 2,3-Bis(difluoroamino)butane.

6. 1,2-Bis(difluoroamino)propane.

7. 1,2-Bis(difluoroamino)ethane.

8. 1,2-Bis(difuoroamino)-1-phenylethane.

9. 1,4-Bis(difluoroamino)butene-2.

10. 1,2-Bis(difluoroamino)butene-3.

11. $\alpha,\beta$-Bis(difluoroamino)ethyl isocyanate.

12. N,N' [1,2-bis(difluoroamino)ethyl] urea.

13. A process for the preparation of difluoroamino substituted compounds which comprises reacting ethylenically unsaturated compounds of the general formula

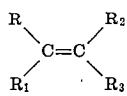

in which R, $R_1$, $R_2$, and $R_3$, taken individually, can be hydrogen, alkyl, alkaryl, alkenyl, alkinyl, aryl, halogen, carbalkoxy, carboxyl, and isocyanato, and any two of R, $R_1$, $R_2$, and $R_3$, on adjacent carbon atoms taken together with the two carbon atoms to which they are attached, can form a ring system selected from the group consisting of cyclopentadiene, tetrahydrobenzene, and carbonate, with tetrafluorohydrazine at temperatures from about 60° C. to about 150° C. and separating the bis (difluoroamino) substituted compound from the reaction mixture.

14. A process for the preparation of difluoroamino substituted compounds which comprises reacting ethylenically unsaturated compounds of the general formula

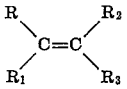

in which R, $R_1$, $R_2$, and $R_3$, taken individually, can be hydrogen, alkyl, alkaryl, alkenyl, alkinyl, aryl, halogen, carbalkoxy, carboxyl, and isocyanato, and any two of R, $R_1$, $R_2$, and $R_3$, on adjacent carbon atoms taken together with the two carbon atoms to which they are attached, can form a ring system selected from the group consisting of cyclopentadiene, tetrahydrobenzene, and carbonate, with tetrafluorohydrazine at temperatures from about 110° to 120° C. and separating the bis(difluoroamino) substituted compound from the reaction mixture.

15. A process for the preparation of difluoroamino substituted compounds which comprises reacting ethylenically unsaturated compounds of the general formula

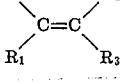

in which R, $R_1$, $R_2$, and $R_3$, taken individually, can be hydrogen, alkyl, alkaryl, alkenyl, alkinyl, aryl, halogen, carbalkoxy, carboxyl, and isocyanato, and any two of R, $R_1$, $R_2$, and $R_3$, on adjacent carbon atoms taken together with the two carbon atoms to which they are attached, can form a ring system selected from the group consisting of cyclopentadiene, tetrahydrobenzene, and carbonate, with tetrafluorohydrazine at temperatures from about 90° C. to about 150° C., the pressure on the reaction mixture being from about 1 atmosphere to about 10 atmosphere, and separating the bis(difluoroamino) substituted compound from the reaction mixture.

16. A process for the preparation of difluoroamino substituted compounds which comprises reacting ethylenically unsaturated compounds of the general formula

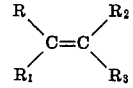

in which R, $R_1$, $R_2$, and $R_3$, taken individually, can be hydrogen, alkyl, alkaryl, alkenyl, alkinyl, aryl, halogen, carbalkoxy, carboxyl, and isocyanato, and any two of R, $R_1$, $R_2$, and $R_3$, on adjacent carbon atoms taken together with the two carbon atoms to which they are attached, can form a ring system selected from the group consisting of cyclopentadiene, tetrahydrobenzene, and carbonate, with tetrafluorohydrazine at temperatures from about 90° C. to about 150° C., the molar ratio of ethylenically unsaturated compounds per double bond contained in said compound to tetrafluorohydrazine being from 1 to 1 to 1 to 2.5, and separating the bis(difluoroamino) substituted compound from the reaction mixture.

17. A process for making difluoroamino compounds which comprises reacting propylene with tetrafluorohydrazine at a temperature of about 150°C.

18. A process of preparing a bis(difluoramino)alkyl nitrile which comprises reacting an olefinic nitrile with tetrafluorohydrazine at a temperature of at least 120°C.

19. A process of preparing a bis(difluoroamino)alkyl nitrile which comprises reacting an olefinic nitrile with tetrafluorohydrazine at a temperature of at least 110°C.

* * * * *